(12) United States Patent
Bharadwaj et al.

(10) Patent No.: US 9,706,016 B2
(45) Date of Patent: Jul. 11, 2017

(54) UNCONSTRAINED SUPERVISOR SWITCH UPGRADE

(71) Applicant: CISCO TECHNOLOGY, INC., San Jose, CA (US)

(72) Inventors: Harsha Bharadwaj, Bangalore (IN); Prabesh Babu Nanjundaiah, Tumkur (IN); Sumanth Sindiri, Bangalore (IN); Ankan Ghosh, Bangalore (IN); Kishan Kumar Kotari Uppunda, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 251 days.

(21) Appl. No.: 14/051,896

(22) Filed: Oct. 11, 2013

(65) Prior Publication Data

US 2015/0103644 A1    Apr. 16, 2015

(51) Int. Cl.
| | |
|---|---|
| *H04L 12/26* | (2006.01) |
| *H04L 29/06* | (2006.01) |
| *H04L 12/24* | (2006.01) |
| *H04L 12/707* | (2013.01) |
| *H04L 29/08* | (2006.01) |
| *H04L 29/14* | (2006.01) |
| *H04L 12/751* | (2013.01) |

(52) U.S. Cl.
CPC .......... *H04L 69/22* (2013.01); *H04L 41/082* (2013.01); *H04L 45/22* (2013.01); *H04L 67/34* (2013.01); *H04L 29/14* (2013.01); *H04L 43/10* (2013.01); *H04L 45/02* (2013.01)

(58) Field of Classification Search
CPC ......... H04L 45/22; H04L 45/02; H04L 29/14; H04L 43/10
See application file for complete search history.

(56) References Cited

U.S. PATENT DOCUMENTS

| | | | | |
|---|---|---|---|---|
| 7,769,885 | B1 * | 8/2010 | Kompella | H04L 45/00 370/219 |
| 8,719,413 | B1 * | 5/2014 | Sasso | H04L 67/1097 709/223 |
| 2003/0193890 | A1 * | 10/2003 | Tsillas | H04L 45/02 370/216 |
| 2006/0203735 | A1 * | 9/2006 | Takatori | H04L 12/462 370/242 |

(Continued)

*Primary Examiner* — Michael Thier
*Assistant Examiner* — Brian Cox
(74) *Attorney, Agent, or Firm* — Patent Capital Group

(57) ABSTRACT

In one example embodiment, a time unconstrained fabric switch software upgrade function is described for an in-switch-software-upgrade/downgrade (ISSU) in a network switch. Prior to an ISSU, Hello protocol data unit (PDU) information is stored for relevant control protocols of associated interfaces of the switch. The Hello PDU information comprises information on messages and data exchanged by the control protocols that may be used to maintain communications links of the switch. During the configuring of the ISSU, and while the control plane of the switch is, at least partially, dysfunctional, Hello PDUs are sent on the interfaces according to the stored PDU information in order to maintain the communication links. The Hello PDU information may include a time interval value for each relevant protocol that determines when Hello PDUs are sent.

20 Claims, 5 Drawing Sheets

(56) References Cited

U.S. PATENT DOCUMENTS

| | | | |
|---|---|---|---|
| 2007/0165515 A1* | 7/2007 | Vasseur | H04L 12/66 |
| | | | 370/216 |
| 2009/0154340 A1* | 6/2009 | Kumaresan | H04L 45/02 |
| | | | 370/218 |
| 2009/0262643 A1* | 10/2009 | Zhao | H04L 12/423 |
| | | | 370/217 |
| 2014/0173579 A1* | 6/2014 | McDonald | G06F 8/65 |
| | | | 717/170 |
| 2014/0369230 A1* | 12/2014 | Nallur | H04L 45/02 |
| | | | 370/254 |

* cited by examiner

UNCONSTRAINED SUPERVISOR SWITCH UPGRADE

TECHNICAL FIELD

This disclosure relates in general to switching nodes and more particularly, to a method, a system, and an apparatus for providing a time-unconstrained software upgrade/downgrade for a switching node in a communications network.

BACKGROUND

Switching nodes are used in communications networks to switch and route data traffic between sources and destinations. A switching node typically receives data traffic in the form of data packets on input/output (I/O) interface ports and outputs the data packets on appropriate I/O interface ports to direct the data packets to an appropriate destination in the communications network. A switching node may support multiple interface protocols and maintain multiple communication links on its interface ports with other switching nodes or other devices or networks. These devices or networks may be, for example, data storage devices, servers, local networks, or other similar communication devices.

As a switching node functions within a communications network there may be a need to perform an in-switch software upgrade/downgrade (ISSU). In order to avoid adverse effects on a switching node's communication links, the ISSU may have to be performed while the switching node remains in service in the network and while maintaining the communication links on its interface ports with neighbor switching nodes or devices. The control plane supervisor software in a switching node maintains the communication links of the switching node by exchanging protocol data units (PDUs) with neighbor nodes. Any failure of PDU exchange on a link may result in the link being brought down by link timeout at one of the communicating nodes.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method and apparatus for a time unconstrained switch software upgrade is described in the example embodiments of this disclosure. In one example embodiment of the method and apparatus, when an in-switch-software-upgrade/downgrade (ISSU) is to occur in a switch, "hello" protocol data unit (PDU) information is stored for relevant control protocols of associated interfaces of the switch that maintain communications links of the switch in a communications network. Note that the term ISSU, as used herein, includes any type of software enhancement, modification, reduction, restriction, demotion, etc. During the ISSU procedure, and while the control plane of the switch is, at least partially, dysfunctional (e.g., down), Hello PDUs are sent on the interfaces according to the stored PDU information in order to maintain the communication links. The Hello PDUs may be sent for each relevant control protocol of a switch interface according to PDU information stored that includes a time interval value.

In certain embodiments, the time interval value may indicate a "hello" time interval for the relevant protocol. A hello time interval indicates a time interval that may occur between Hello PDUs being sent and may be set to be less than a "dead time" interval for the relevant protocol. The dead interval time can be the maximum wait time between Hello messages being received at a switch before the link with the adjacent switch or device that is expected to send the Hello PDUs is declared down. During the ISSU procedure, each time the hello time interval for a protocol expires, Hello PDUs are sent again for the relevant protocol on the associated interface.

In certain embodiments, when it is determined that the control plane is back up, the sending of the Hello PDUs is terminated and the control plane of the switch and control protocols take control of link maintenance on the interfaces. Note that the term Hello PDU as used in this Specification and in the claims can include any type of PDU, message or data that is sent or exchanged by any control protocol controlling any type of communications link to maintain the link whether other communication is there or not. Hello PDUs may be sent, for example, periodically or according to any other manner for the relevant control protocol. Hello protocol data unit information or Hello PDU information means any data or information relating to the formation, structure, contents, or sending of Hello PDUs that may be used to form a Hello PDU. In-switch-software-upgrade/downgrade (ISSU) as used in this Specification and in the claims means any type of software installation or modification, including upgrades, downgrades or replacements.

Example Embodiments

Figure 1A:
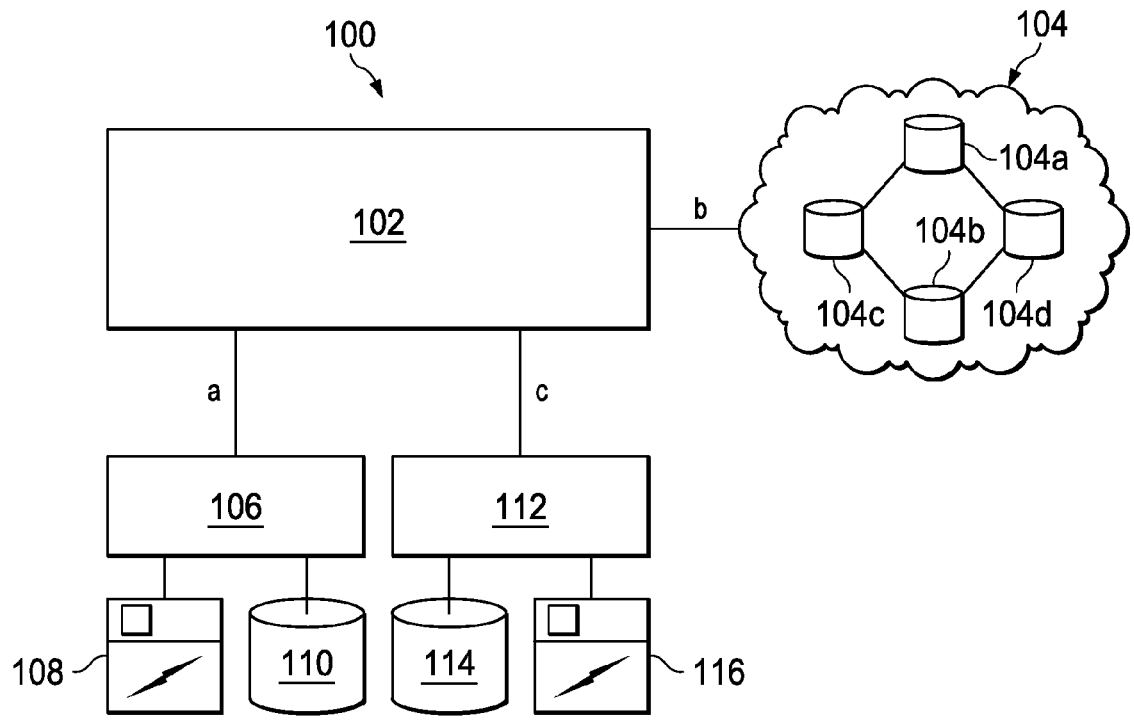
FIG. 1A is a simplified block diagram illustrating a network into which an example embodiment of the disclosure may be implemented.

The method and apparatus will now be described by use of exemplary embodiments. The exemplary embodiments are presented in this disclosure for illustrative purposes, and not intended to be restrictive or limiting on the scope of the disclosure or the claims presented herein. Referring now to FIG. 1A, therein is a simplified block diagram illustrating a network into which an example embodiment of the disclosure may be implemented. FIG. 1 shows network 100 that includes switch 102, network 104, switch 106, server 108, storage device 110, switch 112, storage device 114 and server 116. Network 104 includes servers 104a-104b. Switch 102 is shown connected to switch 106 over interface a, to switch 112 over interface c, and to network 104 over interface b. In the embodiment of FIG. 1A, switch 102 is implemented to include functions that allow in-switch-software upgrade/downgrade according to the disclosure. While the example embodiment of FIG. 1A is shown in one particular configuration with switch 102, it is to be understood that the method and apparatus of the disclosure may be implemented in any other type of switch or switching node, within any type of network, in which the method and apparatus may prevent link timeout or failure during ISSU type software upgrades/downgrades.

Note that in a switching node in which performance of an ISSU requires that the control plane supervisor software be brought down during the ISSU, for example, a fabric switch in which control (supervisor) and data (linecard) functionality is running on the same central processing unit (CPU) and in which there is no back-up supervisor software to maintain the interface control protocols of the switching node's communications links, link timeout or failure relative to the other switching nodes or devices could occur. Possible link timeout or failure becomes more likely as the time constraints on the exchange of PDUs of the relevant interface control protocols are more stringent. Possible link timeout or failure also becomes more likely the longer an ISSU takes. In some current configurations of switching nodes in which the number of processes and amount of persistent state information that needs to be restored after an ISSU is large, it may not be possible to perform an ISSU within the time constraints of the interface protocols without link failure occurring.

It would provide an advantage therefore, have an apparatus and method for performing an ISSU with the control plane down in a switching node which was time unconstrained, and in which link states of the switching node could be maintained during the ISSU to prevent link failure.

In accordance with the teachings of the present disclosure, example embodiments discussed herein can reduce downtime of Hello based protocols during ISSU. The reduced downtime is achieved by storing the Hello PDU information into a file prior to the start of ISSU. The PDU information may then be restored and read from the boot image. Hello PDUs may be sent after the operating system (OS) kernel is loaded without waiting for the control protocol to come up. This provides an advantage in that there is minimal wait time in exchanging Hello PDUs during an ISSU. This contrasts to previous solutions in which the system image needs to load various infrastructure services and in which the entire control plane needs to restore its persistent state, comeback up, and then start exchanging Hello PDUs. The control protocols are technically in an active state within a few seconds of ISSU start and before the dead time interval of the control protocols. The reduction in downtime for Hello PDUs also allows detection of link level issues faster by control protocols on the switches or devices neighboring the switch undergoing ISSU.

The method and apparatus disclosed in the example embodiments has advantage in switches that support interfaces such as, for example, fiber channel (FC), fiber channel over Ethernet (FCoE) and/or fiber channel over IP (FCIP) interfaces. These types of interfaces may use control protocols such as, for example, Fabric Shortest Path First (FSPF), FCoE Initialization Protocol (FIP), Link Aggregation Control Protocol (LACP), or Link Layer Discovery Protocol (LLDP) to maintain the communication link states and peer information of the switch. Control protocols such as FSPF, FIP and LACP may maintain the link states and peer information by exchanging messages or data with neighbor switches and devices. To maintain the link states, the control protocols periodically, or otherwise, exchange the messages or data, referred to now as Hello PDUs, with the neighbor switches and devices. Each control protocol has a dead interval time for Hello PDUs. FSPF is a link state protocol in which Hello messages are used to establish FC or FCoE connectivity with a neighbor switch and to establish the identity of the neighbor switch. FSPF has a default Hello interval of 20 seconds. The dead interval time for FSPF is has a default value of 80 seconds. FIP is a link state protocol that is used in FCoE end-ports such as, for example, VF_Ports and VE_Ports. End ports such as VF_Port and VE_Port generate a Link-Keep_Alive (LKA) ELS to verify Virtual Link connectivity in the absence of other FC traffic. The dead interval time for FIP LKA is 2.5 times the keep alive interval, after which, the missed LKA responses may cause the virtual link teardown. The default LKA interval (Hello interval) is 8 seconds and the default dead interval time is 20 seconds. LACP protocol is used for creation of Ethernet port-channels by exchanging LACP PDUs between connected ports. Missed keep-alive PDUs may cause a port to be removed from the port channel or to be put in shut state. LACP with slow-rate may be enabled during an ISSU and has a 30 second keep alive interval (Hello interval) and dead interval of 90 seconds. LLDP is a link level protocol for discovering neighbor information and building network topology. The default dead interval for LLDP is 120 seconds. The dead interval of LLDP may be set to a maximum of 255 seconds. As stated earlier, the term Hello PDUs as used in this Specification, and presented in the claims, is meant to include, but is not limited to, the Hello messages of FSPF, the LKA ELSs of FIP, the keep alive PDUs of LACP, and the messages of LLDP described above.

During an ISSU if the control plane goes down longer than a time interval value of the dead interval time for a control protocol maintaining a link on an interface of a switch, the link will fail. As an example, a goal for a current generation of fabric switch now being released has been benchmarked as to have a fabric switch ISSU completed within 80 seconds with the FSPF dead time interval as the reference. To reach the goal time, a kexec software program is used to perform a fast reboot to avoid going through the BIOS to load the new images. Once the fabric switch comes back online after ISSU, a process called the installer gets the current timestamp and computes the total downtime for the ISSU. If the downtime exceeds the 80-second dead interval of FSPF, the installer will consider this a failed ISSU and will reboot the switch. As switch technology advances and number of processes and the amount of persistent state information required to be restored after kexec increases, it becomes difficult to complete an ISSU within 80 seconds. On newer generation fabric switches in which a fabric switch may support multiple control protocols such as, for example, the FC, FCoE and FCIP control protocols, and in which the linecard components for these protocols may run on the same CPU, it would be difficult to meet the 80 second benchmark set for the above described previous generation fabric switches. For example, current models of fabric switches may have typical ISSU times of the order of 200 seconds.

A basic solution to the problem would be to request manual intervention from the user to configure larger time interval values for Hello PDUs on each of the peer switches of the switch receiving the ISSU, and then reset the time interval values back to the original configured values after ISSU. This is contrary to the trend for minimal user intervention and is not a practical solution. In another solution, a protocol may be defined to include a provision to send a control messages to neighbors to increase the hello/dead interval timeout values upon detection of an ISSU, but there is also an upper bound on the interval timeout values fixed by the various protocol standards. For protocols like LLDP that has a large maximum dead timeout value of 255 seconds, this would be the simplest and best solution. However, this solution of defining a control message is not possible for every one of the protocols. For example, 150 seconds is the maximum allowed time value for the FIP protocol LKA dead interval. For current model fabric switches that have ISSU times of 200 seconds this would not be a solution. A further solution would be to configure the control protocols to notify their control protocol counterparts on neighboring next-hop switches of an impending switch ISSU and inform them that they are not to expect Hello PDUs during the time of the ISSU. This type of solution requires special messaging and would necessarily be a proprietary solution. This proprietary solution would cause problems with interoperability of network switches and devices manufactured by different manufacturers.

For a switch utilizing multiple protocols of the above mentioned example protocols, or similar protocols, the method and apparatus according to the disclosure provides a solution to the problem of control plane downtime during ISSU. The solution is provided through a mechanism by which the sending of Hello PDUs may be maintained during the ISSU in order to prevent links with adjacent switches or devices from timing out.

Figure 1B:
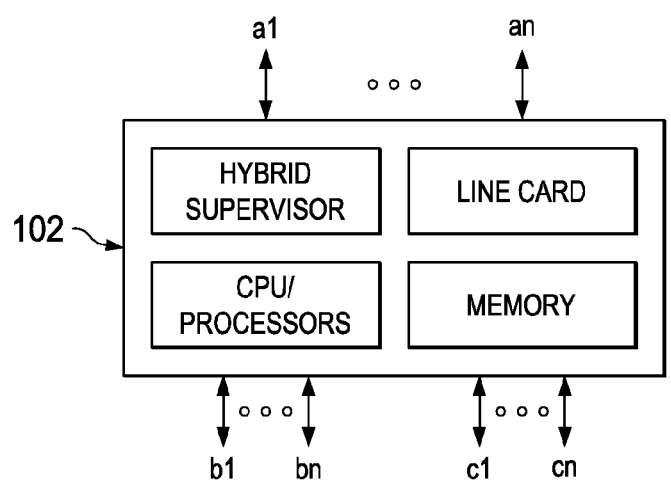
FIG. 1B is a simplified block diagram illustrating functional blocks of a fabric switch in accordance with an example embodiment of the disclosure.

Referring now to FIG. 1B, therein is a simplified block diagram illustrating functions of switch 102 of FIG. 1A in accordance with an example embodiment of the disclosure. Switch 102 includes hybrid supervisor function 120, line card function 122, CPU/processors 124 and memory 126. Input/output (I/O) ports a1-an, b1-bn, and c1-cn represent I/O ports that may be implemented, respectively, on interfaces a, b and c of FIG. 1A. Each of the interfaces would support up to n I/O ports. In the example embodiment, switch 102 may be a single slot fabric switch comprising hybrid supervisor 120 and line card 122. In one example, switch 102 may be implemented as a Cisco Systems model MDS 9250i fabric switch running NX-OS software. Switch 102 may run an operating system (OS) software built, for example, on top of a Linux kernel. The interfaces a-c may each be implemented, for example, as fiber channel (FC), fiber channel over Ethernet (FCoE), fiber channel over IP (FCIP) or Ethernet IP interfaces utilizing the FSPF, FIP, LACP or LLDP control protocols that were described previously. In the embodiment of FIGS. 1A and 1B, the functional blocks of fabric switch 102 may be configured to include functions, including an installer, that provide time unconstrained ISSU of switch 102 according to the embodiments of the disclosure. The time unconstrained ISSU functions maintain the link states of relevant control protocols on the interfaces a-c during ISSU to prevent link timeout and failure while the control plane is down. As part of the ISSU procedure the hybrid supervisor boot image, supervisor system image, linecard image, and bios will be upgraded/downgraded without any traffic interruption. In the embodiment of FIGS. 1A and 1B, the OS infrastructure installer process manages and controls the ISSU procedure. In alternatives of the example embodiment, switch 102 may also be implemented as any other type of switch or node that provides functionality into which the embodiments of the disclosure may be implemented.

Figure 2:
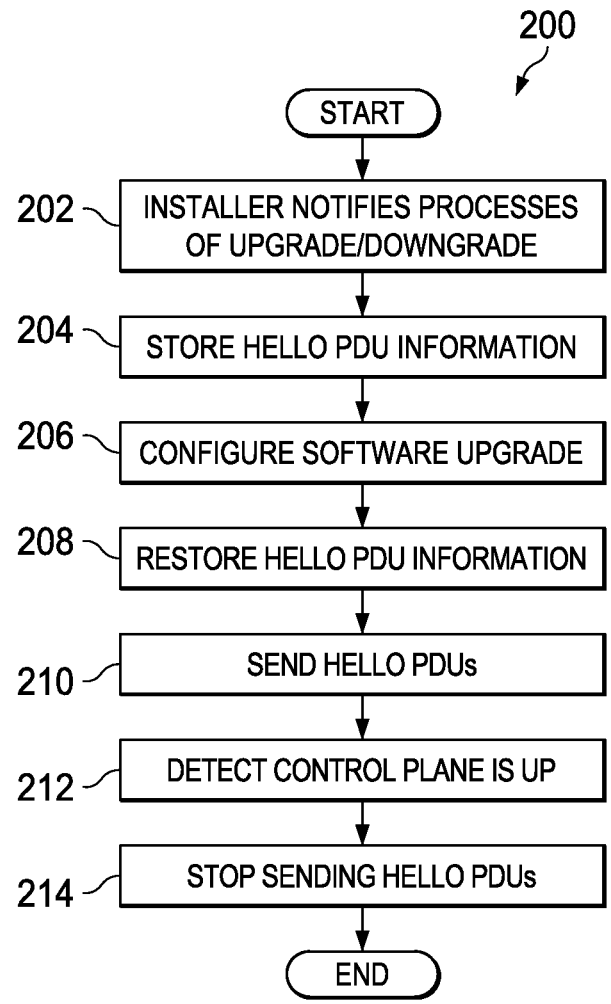
FIG. 2 is a simplified flow diagrams illustrating operations that may be associated with an in-switch-software-upgrade/downgrade (ISSU) process in accordance with an example embodiment of the disclosure.

Referring now to FIG. 2, therein is a simplified flow diagram 200 illustrating operations that may be associated with an in-switch-software-upgrade/downgrade (ISSU) process in accordance with an example embodiment of the disclosure. FIG. 2 shows high-level process operations performed within switch 102 of FIG. 1B, for any relevant control protocol for which Hello PDUs need to be sent to maintain a link state on an interface during the performing of an ISSU.

The process begins at 200 where the installer function notifies all processes within switch 102 that an ISSU is to be performed. At 204, Hello PDU information for each relevant control protocol is stored into a file. At 206 the process of performing the ISSU is started. At 208, Hello PDU information for each relevant protocol is restored and read from the file. At 210, Hello PDUs are sent on the interfaces of the relevant control protocols just after the kernel is loaded and while the ISSU is ongoing. At 210, the process detects that the control plane is, at least partially, restored (e.g., back up) and terminates the sending of the Hello PDUs at 214. The process starts sending Hello PDUs from the boot image just after kexec is completed and the kernel modules are loaded. For example, if kexec takes 40 seconds, Hello PDUs may be transmitted after the boot image is loaded. The contents of the Hello PDUs is mostly static in nature and does not require the control protocol to be running if all the static information is extracted from the protocol and stored prior to the ISSU.

Figure 3:
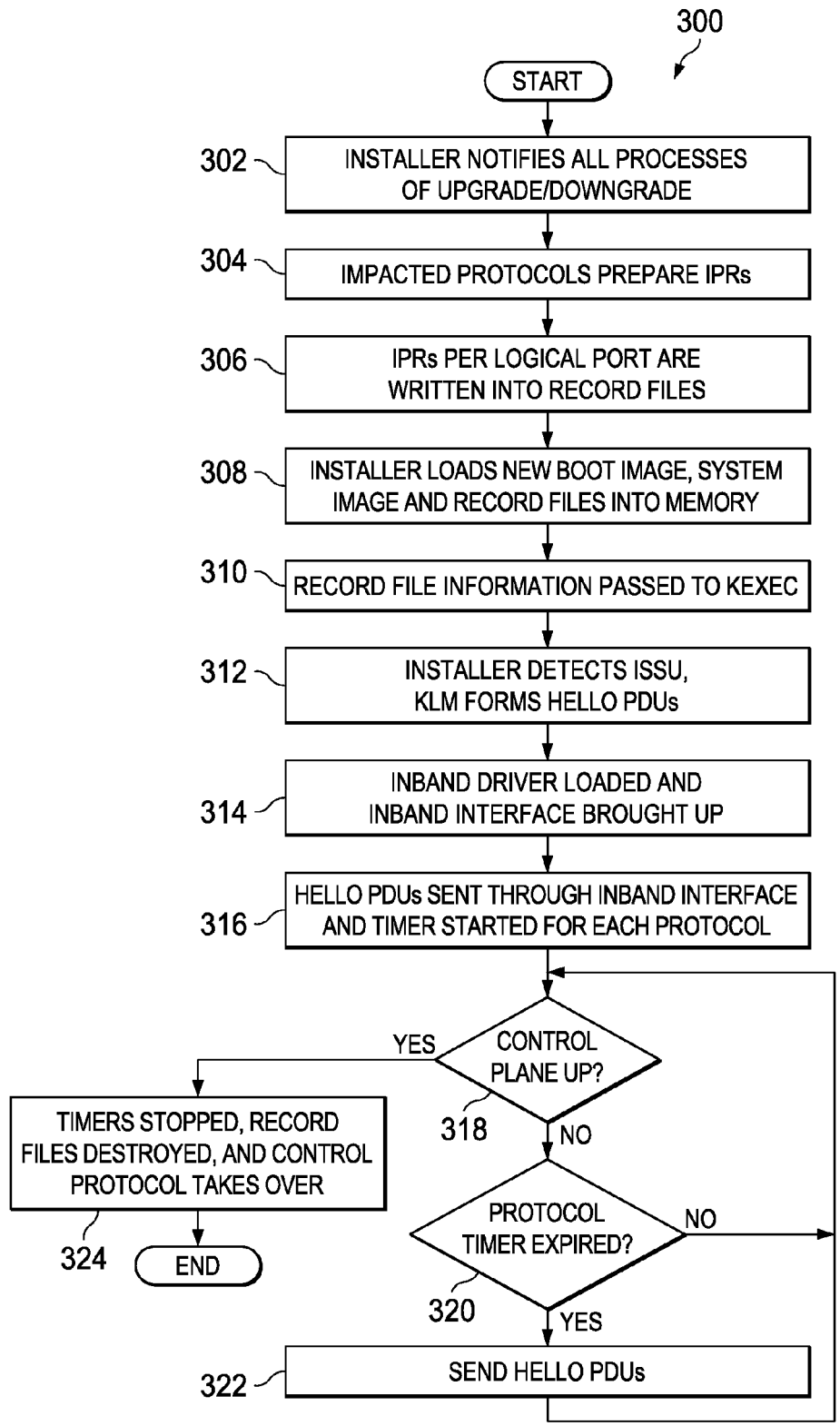
FIG. 3 is a simplified flow diagram illustrating further operations that may be associated with an in-switch-software-upgrade/downgrade (ISSU) process in accordance with an example embodiment of the disclosure.

Referring now to FIG. 3, therein is a simplified flow diagram illustrating further operations that may be associated with an in-switch-software-upgrade/downgrade (ISSU) process in accordance with an example embodiment of the disclosure. The example embodiment process of FIG. 3 may be managed by an installer function implemented in a switch, such as switch 102 of FIG. 1B.

Figure 4:
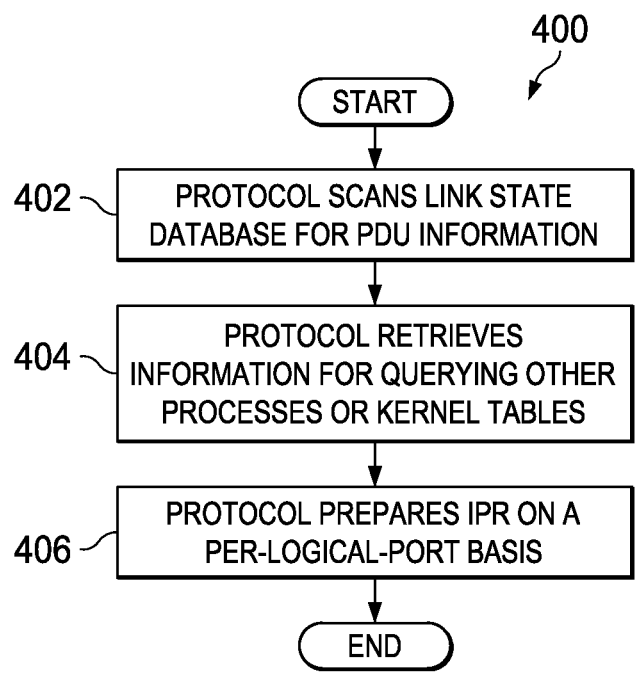
FIG. 4 is a simplified flow diagram illustrating operations that may be associated with operations in the process of FIG. 3 in accordance with an example embodiment of the disclosure.

The process of FIG. 3 begins at 302 where the installer function notifies all processes that the performing of an ISSU is about to begin. At 304 the impacted protocols prepare "interface-protocol-records" (IPRs). Preparation of the IPRs is shown in more detail in FIG. 4, which shows a flow diagram of operations that may be associated with operation 304 in accordance with an example embodiment of the disclosure. At 402 of FIG. 4, the impacted protocols scan their respective link state databases for PDU information that is exchanged in Hello PDUs. In the embodiment the impacted protocols may include, for example, FSPF, FIP, and/or LACP, and the PDU information may include, for example, local_domain_id, remote_domain_id, port_number, FCoE_SMAC, FCoE_DMAC and other related information that is exchanged in any Hello PDUs of impacted protocols. At 404 the impacted protocols also retrieve information used in the Hello PDUs that requires querying other processes or the kernel tables and stores that information as part of the IPR so that a complete Hello PDU can be reconstructed from the IPR. At 406 the impacted protocols prepare the IPRs on a per logical port basis at the point in time of preparation, i.e., per-port-per-VSAN basis. The IPRs are prepared using a predefined data structure for exporting to the kernel.

Figure 6:
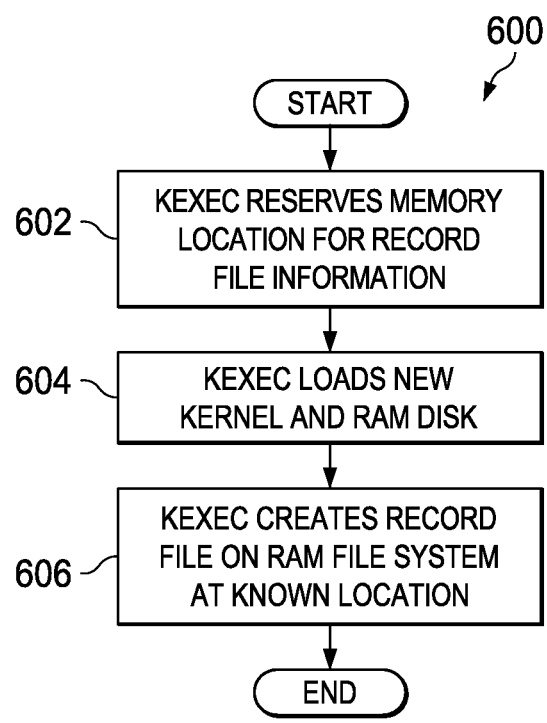
FIG. 6 is a simplified flow diagram illustrating operations that may be associated with operations in the process of FIG. 3 in accordance with an example embodiment of the disclosure.

Referring again to FIG. 3, at 306 the control protocols write the relevant IPRs per logical port into a "record-file" that may be, for example, a regular Linux file, into a predefined location in the file system of the switch prior to the ISSU starting. At 308 the installer function calls kexec load functionality to load the new boot image, including the ramdisk and kernel, the system image, and the record-files into memory. In the embodiment, memory layout is created such that space is allocated for the boot-image, system-image, record-file, and associated data. At 310 the record-file information is passed to kexec as an input parameter. Kexec handling of the record-files is shown in more detail in FIG. 6, which shows a flow diagram of operations that may be associated with operation 310 in accordance with an example embodiment of the disclosure. At 602 of FIG. 6 kexec reserves memory locations for the record-file information. At 604, the installer functions call kexec that loads the new kernel and ram disk. At 606 kexec takes the record files stored in memory and creates the record-files on the RAM file system in a predefined location.

Figure 5:
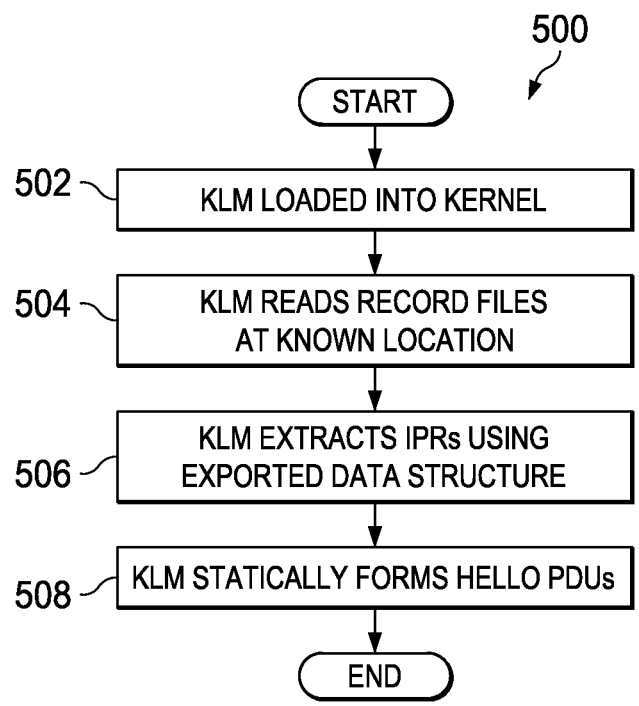
FIG. 5 is a simplified flow diagram illustrating operations that may be associated with operations in the process of FIG. 3 in accordance with an example embodiment of the disclosure.

Referring again to FIG. 3, at 312 the installer function detects the boot up as an ISSU boot up and a helper kernel loadable module (KLM) forms Hello PDUs for the relevant control protocols. The KLM helper function forming of the PDUs is shown in more detail in FIG. 5, which shows a flow diagram of operations that may be associated with operation 312 in accordance with an example embodiment of the disclosure. At 502 of FIG. 5 the installer function loads the helper KLM into the kernel. At 504 the KLM reads the record-files at the predefined location and at 506, extracts the IPRs using the predefined data structure used by the control protocols. At 508 the KLM statically forms the Hello PDUs from the IPRs. The formed Hello PDUs included pre-pended internal and shim headers.

Referring again to FIG. 3, at 314 the driver handling the control packet path (in band driver) that is loaded as part of the new kernel brings up the control path interface (in band interface). At 316 the fully formed Hello PDUs, including headers, are now sent directly through the in band interface. A timer is also started. The timer is set for each Hello time interval of the relevant control protocols in the kernel. At 318, it is determined if a control plane up notification is received. If a notification is not received the process moves to 320. At 320 the relevant control protocol timers are checked for expiration. If no timer has expired the process returns to 318. If, however, a relevant control protocol timer has expired the process moves to 322 where Hello PDUs are sent again for the relevant control protocol. The process then returns to 318. The process continues until a control plane up notification is detected at 318. When a control up notification is detected, the process moves to 324. At 324 the relevant protocol timers are stopped, the record-files are destroyed and the control protocol takes over the Hello PDU sending process.

In the example embodiments, during the ISSU process user configuration is blocked and therefore user induced port state change is not possible on the switch 102. Link failures or configuration changes of port state from neighboring switches or devices may cause a port that was in the UP state before the ISSU began to go down during the ISSU. This will not cause a problem even though the Hello PDUs sent by the switch undergoing ISSU (switch 102) will not reach the control protocol of the neighboring switch or device on the failed link. Once the ISSU is complete it will be determined by switch 102 that there are missed PDUs from the neighboring switch or device and the neighbor information can be removed from the database of switch 102.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

Referring briefly back to certain internal structure that could be used to accomplish the teachings of present disclosure, network 104 represents a series of points or nodes of interconnected communication paths for receiving and transmitting packets of information that propagate through a communication system. Network 104 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In more general terms, switch 102, servers 104*a*-104*b*, switch 106, server 108, storage device 110, switch 112, storage device 114, and server 116 are network elements that can facilitate the switching and upgrade/downgrade activities discussed herein. As used herein in this Specification, the term 'network element' is meant to encompass any of the aforementioned elements, as well as routers, gateways, bridges, data center elements, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, the switches include software to achieve (or to foster) the switching and upgrade/downgrade activities discussed herein. This could include the implementation of instances of software and/or any other suitable element that would foster the activities discussed herein. Additionally, each of these elements can have an internal structure (e.g., a processor, a memory element, etc.) to facilitate some of the operations described herein. In other embodiments, these switching and upgrade/downgrade activities may be executed externally to these elements, or included in some other network element to achieve the intended functionality. Alternatively, any of the network elements may include software (or reciprocating software) that can coordinate with other network elements in order to achieve the switching and upgrade/downgrade activities described herein. In still other embodiments, one or several devices may include any suitable algorithms, hardware, software, components, modules, interfaces, or objects that facilitate the operations thereof.

In certain example implementations, the switching and upgrade/downgrade functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by a processor [processors shown in FIG. 1B], or other similar machine, etc.). In some of these instances, a memory element [memories shown in FIG. 1B] can store data used for the operations described herein. This includes the memory element being able to store instructions (e.g., software, code, etc.) that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the switching and upgrade/downgrade activities, as outlined herein. Additionally, each of these devices may include a processor that can execute software or an algorithm to perform the switching and upgrade/downgrade activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that a communication system (and its techniques) are readily scalable and, further, can accommodate a large number of components, as well as more complicated/sophisticated arrangements and configurations. Accordingly, the examples provided should not limit the scope or inhibit the broad techniques of a communication system, as potentially applied to a myriad of other architectures.

It is also important to note that the steps in the preceding FIGURES illustrate only some of the possible scenarios that may be executed by, or within, a communication system. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by a communication system in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
storing, by a network element, protocol data unit information for a control protocol associated with an interface on the network element;
performing, by the network element, an in-switch-software upgrade/downgrade (ISSU);
periodically sending, by the network element, hello protocol data units (Hello PDUs) on the interface according to the protocol data unit information while an associated control plane is, at least partially, dysfunctional on the network element due to the ISSU, wherein the Hello PDUs being sent prevents timeout of one or more links that connect the network element to other network elements, wherein the Hello PDUs are the same regardless of whether the associated control plane is functional or dysfunctional, and wherein the ISSU is unconstrained by a timeout interval due at least in part to the network element periodically sending the Hello PDUs; and
terminating the sending of the Hello PDUs based on a determination that the associated control plane is, at least partially, restored to functional on the network element.

2. The method of claim 1, wherein the protocol data unit information comprises
a time interval value that is less than the timeout interval and the periodically sending comprises:
sending a first of the Hello PDUs and initiating a timer; and
sending another of the Hello PDUs when the time interval value has transpired on the timer.

3. The method of claim 1, wherein the storing comprises:
scanning a link state database for the control protocol; and
writing the protocol data unit information in at least one interface protocol record for the control protocol on a per logical port basis in a record file.

4. The method of claim 3, wherein the storing further comprises:
writing the protocol data unit information that queries other processes in order to be determined in the record file.

5. The method of claim 3, wherein the performing comprises loading a new boot image, a system image, and the record file in a memory.

6. The method of claim 5, wherein the performing further comprises:
reading the record file and extracting the at least one interface protocol record; and
forming the Hello PDUs based on the at least one interface protocol record.

7. The method of claim 6, wherein the forming comprises appending internal and shim headers onto the Hello PDUs.

8. The method of claim 1 further comprising:
notifying at least one process that the ISSU is to begin.

9. The method of claim 1, further comprising:
determining that Hello PDUs expected from a neighbor node were not received during the ISSU; and
removing information on the neighbor node from a database.

10. An apparatus, comprising:
one or more processors configured to implement an in-switch-software upgrade/downgrade (ISSU) function in the apparatus, the ISSU function being configured to:
store, by the apparatus, protocol data unit information for a control protocol of an interface on a network element;
perform, by the apparatus, an ISSU;
periodically send, by the apparatus, hello protocol data units (Hello PDUs) on the interface according to the protocol data unit information while an associated control plane is, at least partially, dysfunctional on the network element due to the ISSU, wherein the Hello PDUs being sent prevents timeout of one or more links that connect the network element to other network elements, wherein the Hello PDUs are the same regardless of whether the associated control plane is functional or dysfunctional, and wherein the ISSU is unconstrained by a timeout interval due at least in part to the network element periodically sending the Hello PDUs; and
terminating the sending of the Hello PDUs based on a determination that the associated control plane is, at least partially, restored on the network element.

11. The apparatus of claim 10, wherein the protocol data unit information comprises a time interval value that is less than the timeout interval and the ISSU function is configured to periodically send the Hello PDUs by:
sending a first of the Hello PDUs on the interface and initiating a timer; and
sending another of the Hello PDUs on the interface when the time interval value has transpired on the timer.

12. The apparatus of claim 10, wherein the ISSU function is configured to store the protocol data unit information by:
scanning a link state database for the control protocol; and
writing the protocol data unit information in at least one interface protocol record for the control protocol on a per logical port basis in a record file.

13. The apparatus of claim 12, wherein the ISSU function is configured to store the protocol data unit information by:
writing the protocol data unit information that queries other processes in order to be determined in the record file.

14. The apparatus of claim 12, wherein the ISSU function is configured to perform the ISSU by loading a new boot image, a system image, and the record file in a memory.

15. The apparatus of claim 14, wherein the ISSU function is further configured to perform the ISSU by reading the record file and extracting the at least one interface protocol record, and forming the Hello PDUs based on the at least one interface protocol record.

16. The apparatus of claim 15, wherein the forming the protocol data units comprises appending internal and shim headers onto the Hello PDUs.

17. One or more non-transitory computer-readable media comprising computing instructions for execution, and when executed is operable to:
store, by a network element, protocol data unit information for a control protocol of an interface on a network element;
perform, by the network element, an in-switch-software-upgrade/downgrade (ISSU); periodically send, by the network element, hello protocol data units (Hello PDUs) on the interface according to the protocol data unit information while an associated control plane is, at least partially, dysfunctional on the network element due to the ISSU, wherein the Hello PDUs being sent prevents timeout of one or more links that connect the network element to other network elements, wherein the Hello PDUs are the same regardless of whether the associated control plane is functional or dysfunctional, and wherein the ISSU is unconstrained by a timeout interval due at least in part to the network element periodically sending the Hello PDUs; and
terminating the sending of the Hello PDUs based on a determination that the associated control plane is, at least partially, restored on the network element.

18. The one or more non-transitory computer-readable media of claim 17, wherein the protocol data unit information comprises a time interval value that is less than the timeout interval and the computing instructions when executed are further operable to periodically send the Hello PDUs by:
sending a first of the Hello PDUs on the interface and initiating a timer; and
sending another of the Hello PDUs on the interface when the time interval value has transpired on the timer.

19. The one or more non-transitory computer-readable media of claim 17, wherein the storing comprises:
scanning a link state database for the control protocol; and
writing the protocol data unit information in at least one interface protocol record for the control protocol on a per logical port basis in a record file.

20. The one or more non-transitory computer-readable media of claim 19, wherein the ISSU function is further configured to perform the ISSU by reading the record file and extracting the at least one interface protocol record, and forming the Hello PDUs based on the at least one interface protocol record.

* * * * *